US008050890B2

(12) United States Patent
Trinon et al.

(10) Patent No.: US 8,050,890 B2
(45) Date of Patent: *Nov. 1, 2011

(54) SYSTEM AND METHOD FOR ASSESSING AND INDICATING THE HEALTH OF COMPONENTS

(75) Inventors: Jean-Marc Trinon, Liege (BE); Olivier Pignault, Austin, TX (US)

(73) Assignee: BMC Software, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/572,865

(22) Filed: Oct. 2, 2009

(65) Prior Publication Data

US 2010/0023302 A1      Jan. 28, 2010

Related U.S. Application Data

(63) Continuation of application No. 10/377,092, filed on Feb. 28, 2003, now Pat. No. 7,617,073.

(60) Provisional application No. 60/360,742, filed on Mar. 1, 2002.

(51) Int. Cl.
 G06F 11/32 (2006.01)
 G06F 11/36 (2006.01)
(52) U.S. Cl. .......................... 702/183; 702/186; 717/120
(58) Field of Classification Search .................. 702/183, 702/123, 185, 186
 See application file for complete search history.

(56) References Cited

U.S. PATENT DOCUMENTS

| 5,436,909 | A | | 7/1995 | Dev et al. |
| 5,802,383 | A | | 9/1998 | Li et al. |
| 5,968,122 | A | * | 10/1999 | Schlosser et al. ............. 709/223 |
| 6,456,306 | B1 | * | 9/2002 | Chin et al. ..................... 715/810 |
| 6,664,985 | B1 | * | 12/2003 | Bormann et al. ............. 715/835 |
| 7,617,073 | B2 | * | 11/2009 | Trinon et al. .................. 702/183 |
| 2002/0054169 | A1 | * | 5/2002 | Richardson ................... 345/854 |
| 2003/0005486 | A1 | | 1/2003 | Ridolfo et al. |

FOREIGN PATENT DOCUMENTS

WO      WO98/24094      6/1998

OTHER PUBLICATIONS

PCT International Search Report for International Application No. PCT/IB03/01196 dated Jan. 28, 2004.
EPO Search Report for European Patent Application No. 03708433. 2—PCT/IB0301196 dated Dec. 6, 2005.

* cited by examiner

Primary Examiner — Hal Wachsman

(57) ABSTRACT

A system and method for visualization of the components of an enterprise system and the rendering of information about the health or status of the enterprise system, its components, and/or its subcomponents. The invention uses a combination of color codes or other indicators and a combination of algorithms and/or rules-based systems to control the computation of status/severities to associate to components and setup the color codes and indicators.

23 Claims, 2 Drawing Sheets

SYSTEM AND METHOD FOR ASSESSING AND INDICATING THE HEALTH OF COMPONENTS

CROSS-REFERENCE TO RELATED APPLICATIONS

This application is a Continuation of U.S. application Ser. No. 10/377,092, filed on Feb. 28, 2003, now U.S. Pat. No. 7,617,073, entitled "System and Method for Assessing and Indicating the Health of Components" which claims priority to Provisional Application No. 60/360,742 filed on Mar. 1, 2002 each of which is incorporated herein by reference.

This application incorporates by reference the program code provided as an uploaded text (i.e., .txt) file "10377092_ComputerListing," created on Jun. 5, 2008, and consisting of 10.3 KB.

FIELD OF THE INVENTION

The present innovation preferably relates to the Availability Management and Business Processes/Systems Management of the Enterprise Systems Management (ESM) field where programs or humans assess the "health" of the various components, including information technology (IT) components or non-IT components, which are combined to build a complex system delivering a service.

BACKGROUND OF THE INVENTION

In today's environments, companies are setting up very complex systems in order to provide services to their customers. Those services are often built using a large variety of components. For example, those components can be computers, computer peripherals, computer programs, networking equipment, and manufacturing equipment. Components can also be virtual components like business processes that can be combined into a business system.

The different components relate to each other in different ways. Some components are being parts of others, while some components are using the service provided by other components in some way. Those systems are represented in a number of different ways through Graphical User Interfaces (GUI) of computer programs. The more common representations are:

A single view showing the components at one level, such as the window seen when a user double clicks on the icon representing the computer on his or her desktop;

An expandable tree (like in the left window of the WINDOWS® EXPLORER); and

An star tree, such as the technology from Inxight Software Inc.

The users can navigate through the representation of the systems by expanding parts of the tree or by selecting the icons representing the component they want to explore further. This typically results in showing more details over the selected component. In doing so, the user can see the components that are part of the selected component or components that the selected component is depending upon.

However, with very complex systems, the amount of components to display quickly surpasses the capacities of today's computer screens. That is why the GUIs are typically showing only one subset of the components of the system. The different representations are using different techniques for that matter but in any case they simply reduce the amount of components displayed to those being close to the last selected component.

When it comes to render the "health" or status information about the displayed components, the solutions implemented today are relying on some coloration applied to, around, or behind the icons representing the component. The color used indicates a severity level associated to the "health"/status of the component. This coloration technique has been used since the first implementation of such software. Different colors were associated to different severity levels, translating different "health" conditions. Those "health" conditions are usually conveyed to the software as alarms, alerts, events, Simple Network Management Protocol (SNMP) traps or equivalent forms. As discussed herein, these are sometimes referred to as events.

To translate how severe they are, a scale of severities is usually provided. Color codes are then associated to each severity level. There are two common ways of determination for the component coloration:

the component is colored using the color of the highest severity amongst the events; and a status is computed from the events associated with the component. The status is assigned a severity (through some computation) and the color associated to that severity is used.

When currently available software have been applied in situations wherein the number of components made it difficult or impossible to display all the components, propagation techniques have been developed so that a component would get a color depending on its own health, but also on its subparts or the components depending on it. Notably, all existing implementations are using a single color code per component.

Typically, the color of the component will be determined by the highest severity among the status/alerts of the component itself and its subcomponents or components it depends upon. This means that some information is lost because when the component is assigned a color code, it is not possible to know if it is because of its own status/alerts or the ones from its subcomponents.

Some variations have been introduced, but they still use one single color code. For example, in HP™ OPENVIEW, the color of a component can be the result of a computation that is looking at the percentage of components at a given severity level to decide about the severity to associate to the component that they are part of or that depends on them. Additionally, BMC Software has created PATROL® Explorer which uses WINDOWS® EXPLORER-like displays to portray the enterprise hierarchically and topical maps to display the enterprise geographically or logically. Moreover, TIVOLI™ BUSINESS SYSTEMS MANAGER uses hyperbolic technology to provide information such as how an outage affects enterprise resources and relationships.

Because some information is lost in the process of aggregating the severities to one single color, there are some situations where the information provided by the color code requires the user to further manipulate the GUI before he can accurately assess the situation. Therefore, a need exists to be able to provide more indication information rather than the conglomeration of information into a single indicator.

SUMMARY OF THE INVENTION

The following provides a visualization of the components of such systems and the rendering of information about their "health" or status. The invention comprises using a combination of color codes or other indicators and a combination of algorithms and/or rules-based systems to control the computation of status/severities to associate to components and setup the color codes and indicators. Though the present disclosure focuses on the use of two or three different indicators, it is envisioned that the concepts herein may be applied to a plurality of indicators. The invention remedies the disadvantages of using a single color code or indicator for providing feedback on the health/status or components in a complex Enterprise System.

BRIEF DESCRIPTION OF THE DRAWING

The foregoing and other features, functions and benefits will be better understood from the following detailed description of the invention with reference to the drawing wherein.

DETAILED DESCRIPTION OF PREFERRED EMBODIMENT

The present invention offers a significant improvement over the previous methods of visualizing components. Using a representative example, these prior systems and methods fail to provide sufficient health indication. In a representative example, component A is composed of components B and C or depends on components B and C. For the purposes of this example, a green indicator is used when a component is healthy and a red one when it is not. If A is healthy and B or/and C is not, then a red indicator is used for A in these systems, even if A is not actually impacted.

If A is not healthy and B and C are healthy, then a red indicator is used for A. The same color indicator is used and it does not enable to distinguish between the two situations in these systems. These systems and their methods of use require additional navigation through the GUI to distinguish these different situations.

Though the present invention is capable of a plurality of color codes and/or indicators, for the sake of simplicity, explanations hereafter are considering the use of two color codes or indicators. The color codes or indicators are still conveying severity information but when using two colors for a single component, information about the component and information about the underlying components can be conveyed separately. That allows the user to know whether the element or/and its subcomponents or components depending from it are healthy.

Using this technique, the health/status of a component can be completely independent from the health/status of its subcomponents or components depending from it. It enables the user to have very complex algorithms or rules-based systems that can derive (e.g., through aggregation) the health/status of a component from the events/alerts received on the component itself (if any) and the events/alerts received for its subcomponents or components depending from it.

An algorithm can be developed to compute the second color code or indicator that is providing information about the underlying components. Basically the algorithm computes severity levels. It computes the "self-severity" based on the health/status of the component itself. It also computes an "sub-severity" based on the health/status of the subcomponents or the components that the component depends upon. In a preferred embodiment, if the component does not have any own health/status level, its "self-severity" will be the same than the "sub-severity."

The "sub-severity" of a component is computed by taking into consideration both the "self-severity" and "sub-severity" of each subcomponents or components it depends upon. Doing this allows the sub-severity to provide information not only about the direct subcomponents but also on subcomponents several levels down. The exact formula for composing the "self-severity" and "sub-severity" can have variations.

Figure 1:
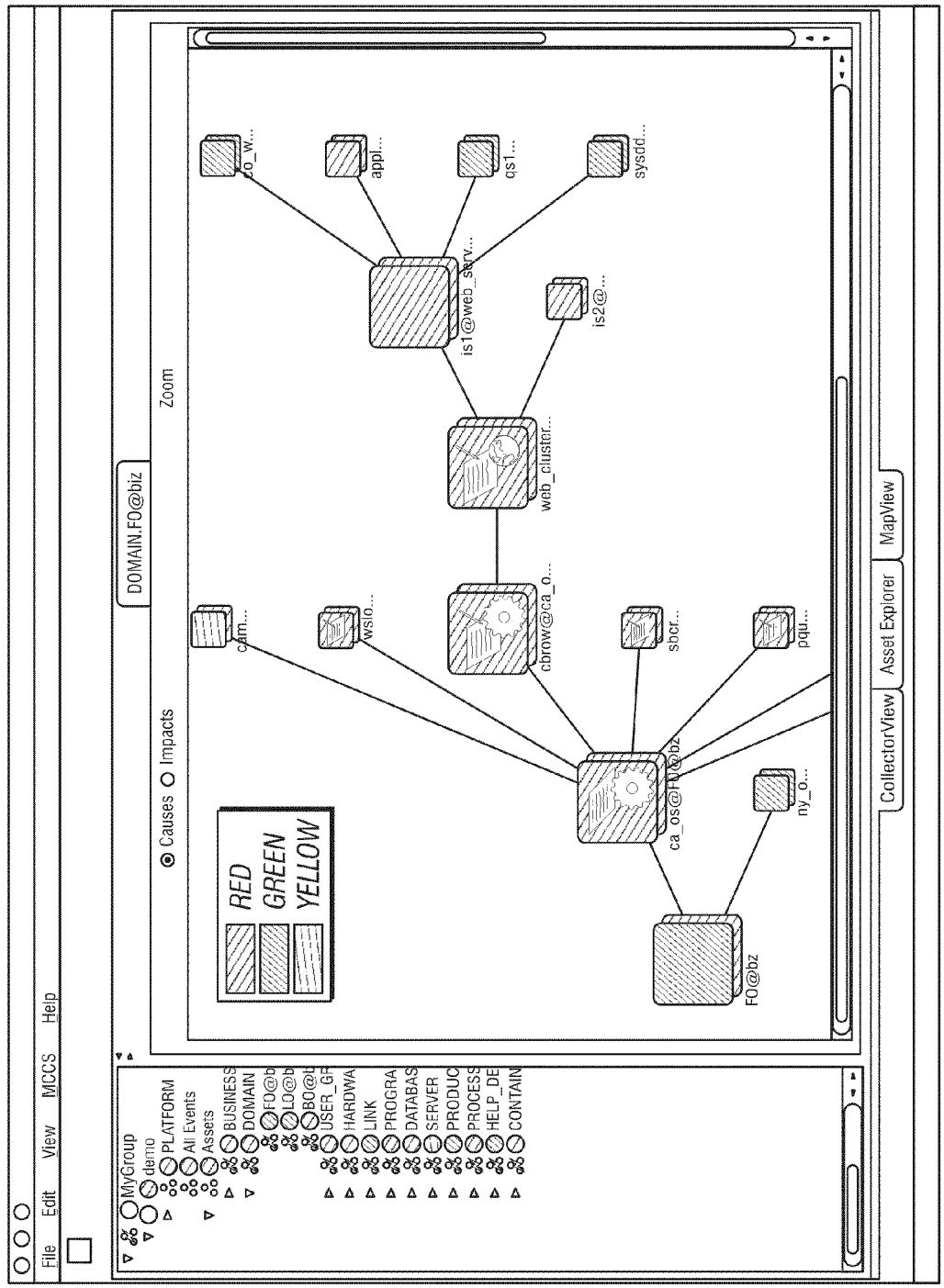
FIG. 1 is an illustrative representation rendered from a preferred embodiment of the system.
Figure 2:
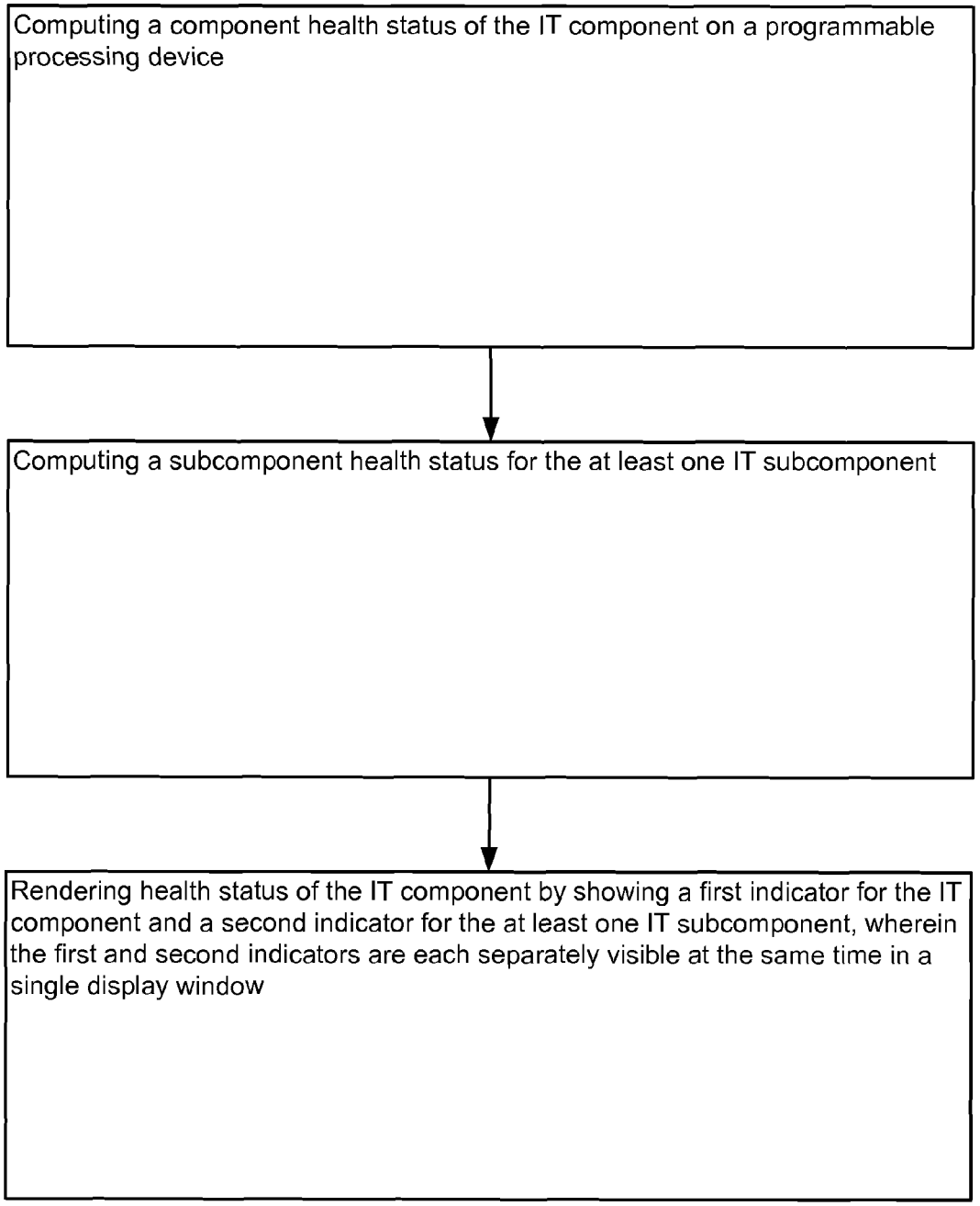
FIG. 2. illustrates a flow chart 200 of one possible embodiment of the steps of computing a component health status according to aspects of this disclosure.

Referring to FIG. 1, a preferred embodiment of a representation from the system is shown. This figure illustrates the use of two color indicators in a tree presentation. FIG. 1 shows a representative interface showing multiple indicators in use. In this figure, the components are shown in both a tree structure and a branching hierarchy.

Those skilled in the art will recognize that the novel and inventive concepts described herein are applicable with any form of hierarchy or representation of the same. Notably, the use of shades, colors, or any other indicia for the indicators is within the scope of the invention. The representative structure provides more information on the health of the components that was possible in previous systems and methods of their use.

As an illustration, a green indicator is used when a component is healthy and a red one when it is not. As shown, component FO@biz is composed of components ca_os@FO@biz and ny_os@FO@biz. Component FO@biz contains a plurality of indicators, namely a green indicator in the foreground and a red indicator in the background. Accordingly, a user can assess that component FO@biz is healthy while an underlying component is not healthy.

Following the branch to component ny_os@FO@biz, both the indicator in the foreground and the indicator in the background are green, and thus it is healthy. In this situation, nothing is depending from component ny_os@FO@biz. A user may assess that any health problems shown but the indicator in the background of component FO@biz is not related to this component.

Following the branch to component ca_os@FO@biz, both the indicator in the foreground and the indicator in the background are red, and thus the user may assess that the component ca_os@FO@biz is not healthy and at least one component depending from the component ca_os@FO@biz is unhealthy. As shown in this illustration, components cam@ca_os@FO@biz, wslo@ca_os@FO@biz, cbrow@ca_os@FO@biz, sbcr@ca_os@FO@biz, pqu@ca_os@FO@biz, and other components not shown in FIG. 1 depend from component ca_os@FO@biz.

First, component cam@ca_os@FO@biz contains an indicator in the foreground that is yellow and an indicator in the background that is red. This is an example of another indicator, namely the color yellow, that may indicate a suspect health or some other indication, including a severity level, of the component cam@ca_os@FO@biz. The yellow indicator is an example to those skilled in the art of the use of a plurality of indicators in this environment. Moreover, the red indicator in the background allows the user to assess that a component depending from component ca_os@FO@biz is not healthy. In this example, the user could further expand the hierarchy to further assess the situation.

Next, component wslo@ca_os@FO@biz contains both an indicator in the foreground and an indicator in the background that are red. Thus, the user may assess that the component wslo@FO@biz is not healthy and at least one component depending from the component wslo@FO@biz is unhealthy. In this example, the user could further expand the hierarchy to further assess the situation. Those skilled in the art will recognize that components sbcr@ca_os@FO@biz and pqu@ca_os@FO@biz show similar conditions in both the indicator in the foreground and the indicator in the background. As with component wslo@ca_os@FO@biz, the user could further expand the hierarchy to further assess these components.

Turning to component cbrow@ca_os@FO@biz, both the indicator in the foreground and the indicator in the background are red, and thus the user may assess that the component cbrow@ca_os@FO@biz is not healthy and at least one component depending from the cbrow@ca_os@FO@biz is unhealthy. In this example, only one component web_cluster@cbrow@ca_os@FO@biz depends from component cbrow@ca_os@FO@biz.

Referring to component web_cluster@cbrow@ca_os@FO@biz, both the indicator in the foreground and the indicator in the background are red, and thus the user may assess that the component web_cluster@cbrow@ca_os@F-O@biz is not healthy and at least one component depending from the web_cluster@cbrow@ca_os@FO@biz is unhealthy. In this example, two components, namely components is1@web_cluster@cbrow@ca_os@FO@biz and is2@web_cluster@cbrow@ca_os@FO@biz, are shown depending from component web_cluster@cbrow@ca_os@FO@biz.

Both of the components, namely component is1@web_cluster@cbrow@ca_os@FO@biz and is2@web_cluster@cbrow@ca_os@FO@biz contain an indicator in the foreground and an indicator in the background that are red. Thus the user may assess that the components is1@web_cluster@cbrow@ca_os@FO@biz and is2@web_cluster@cbrow@ca_os@FO@biz are not healthy and at least one component depending from each is not healthy. In this example, several components, namely components co_w@is1@web_cluster@cbrow@ca_os@FO@biz, appl@is1@web_cluster@cbrow@ca_os@FO@biz, qs1@is1@web_cluster@cbrow@ca_os@FO@biz, and sysdd@is1web_cluster@cbrow@ca_os@FO@biz depend from component is1@web_cluster@cbrow@ca_os@FO@biz.

Notably, several of the components, co_w@is1@web_cluster@cbrow@c_os@FO@biz, qs1@is1@web_cluster@cbrow@ca_os@FO@biz, and sysdd@is1@web_cluster@cbrow@ca_os@FO@biz depending from component is1@web_cluster@cbrow@ca_os@FO@biz contain both an indicator in the foreground and an indicator in the background that are green. Thus the user may assess that the components co_w@is1@web_cluster@cbrow@ca_os@FO@b-iz, qs1@is1@web_cluster@cbrow@ca_os@FO@biz, and sysdd@is1@web_cluster@cbrow@ca_os@FO@biz are healthy and all components depending from each are also healthy. This allows the user to focus on the unhealthy component.

Component appl@is1web_cluster@cbrow@ca_os@FO@biz contains both an indicator in the foreground and an indicator in the background that are red. Thus the user may assess that the component appl@is1@web_cluster@cbrow@ca_os@FO@biz is not healthy and at least one component depending from it is not healthy.

Those skilled in the art recognize that the present invention is not limited to any specific visualization or GUI style. The inclusion of trees, lists, branches, and/or any other type of visualization is to be considered to be within the scope of the invention. Moreover, any indicator may be composed of any type of indicia including, but not limited to particular shapes for color indicators such as background squares, circles or similar shapes, color indicators, icons, icon variations, or any type of indicia.

The following offers a most preferred embodiment that shows but one embodiment of the system and method. Those skilled in the art recognize that nothing herein is meant to limit the scope of the invention to PERL programs. The following simply provides a limited test and extended test algorithm that demonstrates some of the novel and inventive aspects of the invention. The following materials could be expressed in flowcharts, different steps substituted, replaced, combined, divided, or otherwise rearranged, or other methods that convey the inventive concepts of this system and its method of use.

As a summary, the following preferred algorithm provides for health severity warnings that include UNKNOWN, HARMLESS, WARNING, MINOR, CRITICAL, FATAL, AVAILABLE, AVAILABLE_WITH_ERRORS, and/or NOT_AVAILABLE as shown in the following array. The algorithm includes both a limited test and an extended test.

After sorting and querying the cells, the program can read the severities of the cells. The algorithm is capable of traversing the tree of graphical objects. It computes the maximum severity level for the cell and then calculates the "inherited" severity from the depending cells to it. With respect to the previous example, the foreground indicator would be the cell's health and the background indicator would be the depending cell's health.

This creates four possible scenarios. Referring to the component and the components depending from it as collector and subview respectively, the following Table 1 summarizes the possible outcomes:

TABLE 1

| | Severity Scenarios | | |
|---|---|---|---|
| Scenario | Collector exists? | Subview exists? | Result |
| 1 | Yes | Yes | Self severity is highest severity among the collectors; inherited severity is highest among self and inherited severities on objects in subview |
| 2 | Yes | No | Self severity is highest severity among the collectors; inherited severity is undefined |
| 3 | No | Yes | Self severity is highest severity among self severities; on objects in subview inherited severity is highest among self and inherited severities on objects in subview |
| 4 | No | No | Severities are undefined |

Based on the scenarios, the maximum severities are computed and the array of health indications, such as the array mentioned above, is sorted along the severity continuum.

Next, each object is associated with the appropriate subview until all components are properly aligned with the respective components depending thereto. As a result, this process provides information sufficient to render a graphical representation similar to the illustration shown in FIG. 1.

The program code incorporated by reference provides but one example of how to accomplish the intent of this invention. Those skilled in the art will recognize that significant deviation from this algorithm is still well within the scope of the invention. Though certainly not restrictive of the embodiments that are considered to be within the scope of the invention, the following code offers one embodiment and those skilled in the art will realize that significant variation from this embodiment is meant to be within the scope of this invention.

This system and method and many of its intended advantages will be understood from the disclosure herein and it will be apparent that, although the invention and its advantages have been described in detail, various changes, substitutions, and alterations may be made in the form, construction, and/or arrangement of the elements without departing from the spirit and scope of the invention, or sacrificing its material advantages, the form described previously and subsequently herein as being merely a preferred or exemplary embodiment thereof.

The invention claimed is:

1. A method to indicate the health status of an information technology (IT) component and at least one IT subcomponent, wherein the IT component is dependent on the at least one IT subcomponent, using one or more programmable processing devices programmed to perform the acts of:
   computing a component health status of the IT component on a programmable processing device;
   computing a subcomponent health status for each the at least one IT subcomponent; and
   rendering health status of the IT component by showing a first indicator for the IT component and a second indicator for the at least one IT subcomponent's subcomponents, wherein the first and second indicators are each separately visible at the same time in a single display window.

2. The method of claim 1 wherein the first indicator is a first color and the second indicator is a second color.

3. The method of claim 2 wherein the first and second colors are different.

4. The method of claim 1 wherein the programmed act of computing a component health status further comprises using rules-based systems to control the computation of the health status.

5. The method of claim 1 wherein the programmed act of computing a subcomponent health status further comprises using rules-based systems to control the computation of the health status.

6. The method of claim 1 wherein the programmed act of computing a component health status further comprises using an algorithm to control the computation of the health status.

7. The method of claim 1 wherein the programmed act of computing a subcomponent health status further comprises using an algorithm to control the computation of the health status.

8. The method of claim 1 wherein the programmed act of computing a component health status further comprises receiving a plurality of events and/or alerts from the IT component.

9. The method of claim 1 wherein the programmed act of computing a subcomponent health status further comprises receiving a plurality of events and/or alerts from each IT subcomponent.

10. A method of assessing a status of an information technology (IT) system comprising a plurality of IT components having a plurality of IT subcomponents wherein the method comprises using one or more programmable processing devices programmed to perform the acts of:
    computing a component health status of the plurality of IT components on one or more programmable processing devices;
    computing a subcomponent health status for each the plurality of IT subcomponents;
    computing a health status of the IT system on the one or more programmable processing devices; and
    rendering the computed health status of the IT system on a single display window of a display device wherein the user may ascertain the health status of components and subcomponents without navigating to another window.

11. The method of claim 10 which further comprises using a graphical user interface to view the status of the IT system.

12. A method of operating a computer system comprising one or more programmable processors for indicating network element status, the method comprising:
    determining a first status of a first network element using one of the programmable processors;
    determining, on one of the programmable processors, an aggregate status of a second one or more network elements, wherein the second one or more network elements are operatively coupled to the first network element;
    displaying, on a display device communicatively coupled to one of the one or more programmable processors, the status of the first network element using a first indicator; and
    displaying the aggregate status of the second one or more network elements using a second indicator,
    wherein the first and second indicators are in spatial contact.

13. The method of claim 12, further comprising:
    determining, on one of the programmable processors, a second aggregate status of a third one or more network elements, wherein the third one or more network elements are operatively coupled to the first network element; and
    displaying, on the display device, the status of the second aggregate status of the third one or more network elements using a third indicator, wherein the third indicator is in spatial contact with the first or second indicator.

14. The method of claim 12, wherein the act of determining the first status comprises using a rules-based system.

15. The method of claim 12, wherein the act of determining the aggregate status comprises using a rules-based system.

16. The method of claim 12, wherein the act of determining the first status comprises using an algorithm.

17. The method of claim 12, wherein the act of determining the aggregate status comprises using an algorithm.

18. The method of claim 12, wherein the first indicator comprises a first color and the second indicator comprises a second, different, color.

19. The method of claim 12, wherein the first indicator comprises a first symbol and the second indicator comprises a second, different, symbol.

20. The method of claim 12, wherein the act of displaying the first indicator comprises displaying said first indicator in front of the second indicator.

21. The method of claim 12, wherein the act of displaying the first indicator comprises displaying said first indicator so that it contacts at least one edge of the second indicator.

22. A non-transitory computer readable medium having instructions stored thereon for causing a processor to perform the method of claim 12.

23. A networked computer system, comprising:
    a network;
    a plurality of network components communicatively coupled to the network;
    at least one programmable processing device programmed to:
        determine a first status of a first network element;

determine an aggregate status of a second one or more network elements, wherein the second one or more network elements are operatively coupled to the first network element;
provide an indication for displaying the first status of the first network element using a first indicator; and
provide an indication for displaying the aggregate status of the second one or more network elements using a second indicator, wherein the first and second indicators are in spatial contact.

* * * * *